(12) United States Patent
Wang et al.

(10) Patent No.: US 7,930,223 B2
(45) Date of Patent: Apr. 19, 2011

(54) SYSTEM AND METHOD FOR MANAGING PRODUCT RETURNS

(75) Inventors: Chi-Chih Wang, Taipei Hsien (TW); Bing-Yu He, Shenzhen (CN); Yong-Hua Song, Shenzhen (CN); Xian-Feng Wu, Shenzhen (CN); Ya-Quan Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 281 days.

(21) Appl. No.: 12/206,736

(22) Filed: Sep. 9, 2008

(65) Prior Publication Data

US 2009/0171815 A1 Jul. 2, 2009

(30) Foreign Application Priority Data

Dec. 27, 2007 (CN) .......................... 2007 1 0203462

(51) Int. Cl.
*G06Q 10/00* (2006.01)
*G06Q 99/00* (2006.01)

(52) U.S. Cl. ............................ 705/28; 705/308; 705/340
(58) Field of Classification Search ...................... 705/28
See application file for complete search history.

(56) References Cited

U.S. PATENT DOCUMENTS

2005/0216368 A1* 9/2005 Wechsel .......................... 705/28

* cited by examiner

*Primary Examiner* — F. Ryan Zeender
*Assistant Examiner* — Denisse Ortiz Roman
(74) *Attorney, Agent, or Firm* — Frank R. Niranjan

(57) ABSTRACT

A computer-implemented method for managing product returns includes: receiving information of a set of returned products, and recording the returned product information into a storage of a computer; generating a returned product order based on the returned product information; determining if any returned products are reusable; determining to scrap the non-reusable products if the returned products are non-reusable; selecting the reusable products from the returned products if there are reusable products in the returned products; determining if there are any qualified products in the reusable products; warehousing the qualified products into a stock of a manufacturer if there are qualified products in the reusable products; generating a reproduction report for the unqualified products according to the returned product order, and storing the reproduction report into the storage of the computer.

11 Claims, 2 Drawing Sheets

SYSTEM AND METHOD FOR MANAGING PRODUCT RETURNS

BACKGROUND

1. Field of the Invention

Embodiments of the present disclosure relate to inventory management systems and methods, and more particularly to a system and method for managing product returns.

2. Description of Related Art

Product returns have gained greater attention as companies better understand the impact of return management on their business operations and customer relationships. In an effort to improve current returns management, certain solutions are required since more problems are identified in the field of product returns. One example involves returns of products from retail stores, through merchandisers and carriers, to manufacturers or product suppliers. A merchandiser is a company that provides services to businesses that sell products through retail stores. Typically, merchandiser services include verifying placement of the products, auditing stock levels, adding new products, and removing old products.

Throughout the current process of product returns, the product manufacturer has no visibility of the returned products. Until the returned products are received and all of the associated bills are finalized, the manufacturer will not know how many products are coming back to the warehouse, when these products will be received, or how much shipment cost it will be. Such receiving delays and reconciliation errors may significantly increase the manufacturer's operating costs.

What is needed, therefore, is an improved system and method for managing product returns to overcome the above-stated problems and facilitate returns management of product returns.

SUMMARY

A system for managing product returns is provided. The system includes an information recording module, a returned order generating module, a determining module, a product processing module, a product warehousing module, a product scrapping module, and a reproduction module.

The information recording module is configured for receiving information of returned products from a client computer, and recording the returned product information into a data storage system of an application server. The returned order generating module is configured for generating a returned product order based on the information of the returned products, the returned product order comprising a returned cause of the returned products. The determining module is configured for determining if any returned products are reusable by analyzing the returned cause of the returned products, and determining if there are qualified products in the reusable products. The product processing module is configured for selecting the reusable products from the returned products if there are reusable products in the returned products. The product warehousing module is configured for warehousing the reusable products into a stock of a manufacturer. The product scrapping module is configured for determining to scrap the non-reusable products. The reproduction module is configured for generating a reproduction report for unqualified products according to the returned product order, and storing the reproduction report into the data storage system of the application server.

Other advantages and novel features of the present disclosure will be drawn from the following detailed description of certain inventive embodiments of the present disclosure with reference to the attached drawings.

DETAILED DESCRIPTION OF CERTAIN INVENTIVE EMBODIMENTS

Figure 1:
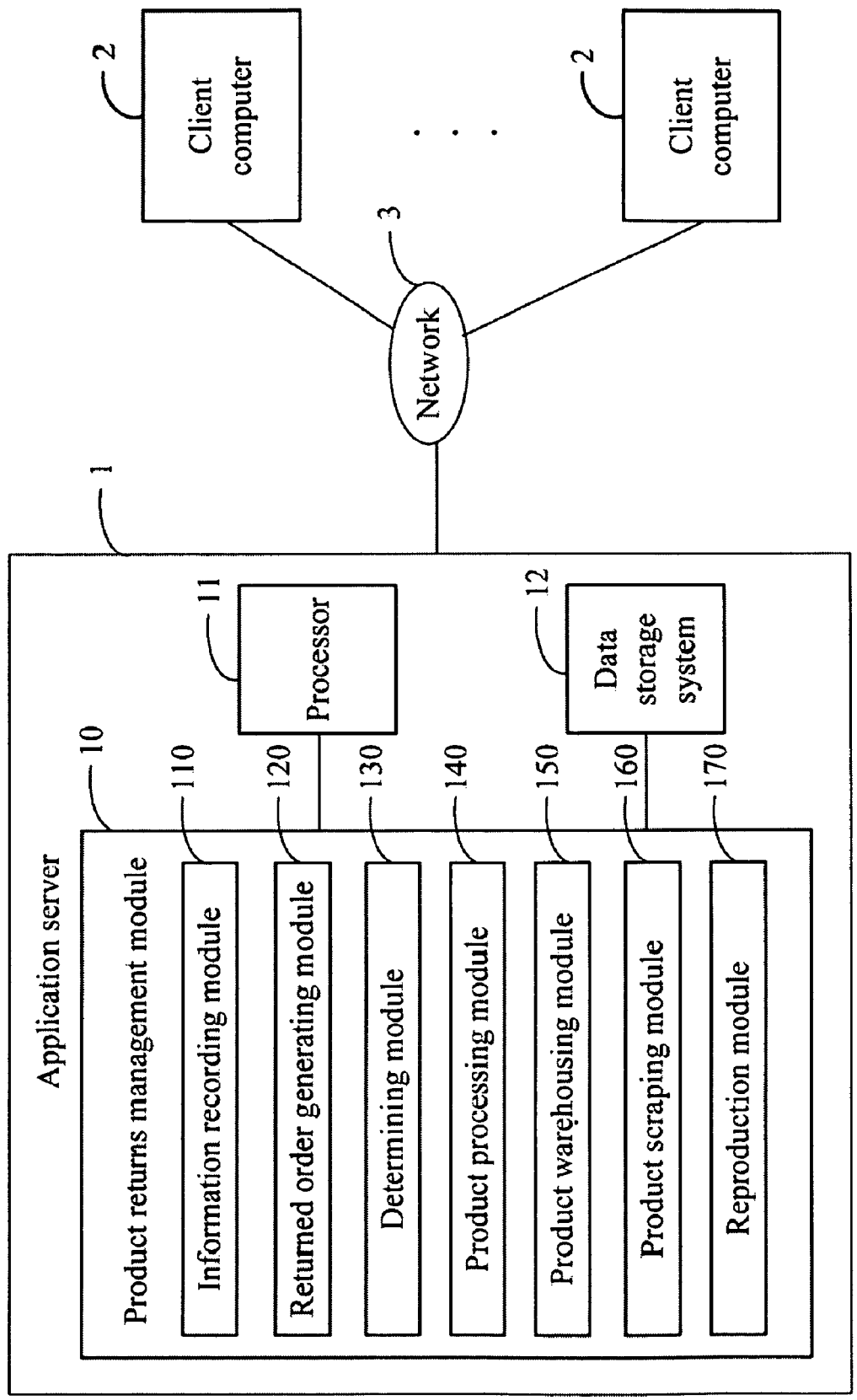
FIG. 1 is a schematic diagram of one embodiment of a system for managing product returns.

FIG. 1 is a schematic diagram of one embodiment of a system for managing product returns. In one embodiment, the system may comprise an application server 1 electronically communicating with a plurality of client computers 2 via a network 3. The application server 1 may be a computer located in manufacturers or product suppliers. The client computers 2 may be located in different places, for example, retail stores, merchandisers, and carriers. The network 3 can be an Intranet, or the Internet, or any other kind of network.

In one embodiment, the application server 1 may comprise a product returns management module 10, at least one processor 11, and a data storage system 12. The product returns management module 10 may be a software program including a plurality of instructions, and installed in the data storage system 12 of the application server 1. The product returns management module 10 is configured for obtaining information of returned products from each of the client computers 2 via the network 3, and managing the returned products from each of the client computers 2. In one embodiment, the product returns management module 10 includes an information recording module 110, a returned order generating module 120, a determining module 130, a product processing module 140, a product warehousing module 150, a product scrapping module 160, and a reproduction module 170. Each of the function modules 110-170 can be executed by the processor 11 of the application server 1.

The information recording module 110 is configured for receiving information of a set of returned products from each of the client computers 2, and recording the returned product information into the data storage system 12 of the application server 1. The returned product information may include, but is not limited to, a customer name, a product number, a product name, a product quality, a returned date, and a returned cause of the returned products.

The returned order generating module 120 is configured for generating a returned product order based on the returned product information, and determining a type of the returned product order according to the returned cause of the set of returned products. The returned product order may include, but is not limited to, the customer name, the product name, the product number, the product quality and the returned cause of the returned products.

The determining module 130 is configured for determining if any returned products are reusable by analyzing the returned cause of the returned products, and determining if there are qualified products in the reusable products, if there are reusable products in the returned products. The determining module 130 is further configured for determining if the unqualified products need to be reproduced according to the type of the returned order.

The product processing module 140 is configured for selecting the reusable products from the returned products, if there are reusable products in the returned products.

The product warehousing module 150 is configured for warehousing the qualified products into a stock of a manufacturer, if there are qualified products in the returned products.

The product scrapping module 160 is configured for determining to scrap the non-reusable products if there are no reusable products in the returned products, and to scrap the unqualified products if the unqualified products do not need to be reproduced by the manufacturer.

The reproduction module 170 is configured for generating a reproduction report for the unqualified products according to the returned product order, storing the reproduction report into the data storage system 12 of the application server 1, and informing a relevant workshop of the manufacturer to reproduction of the unqualified products according to the reproduction report.

Figure 2:
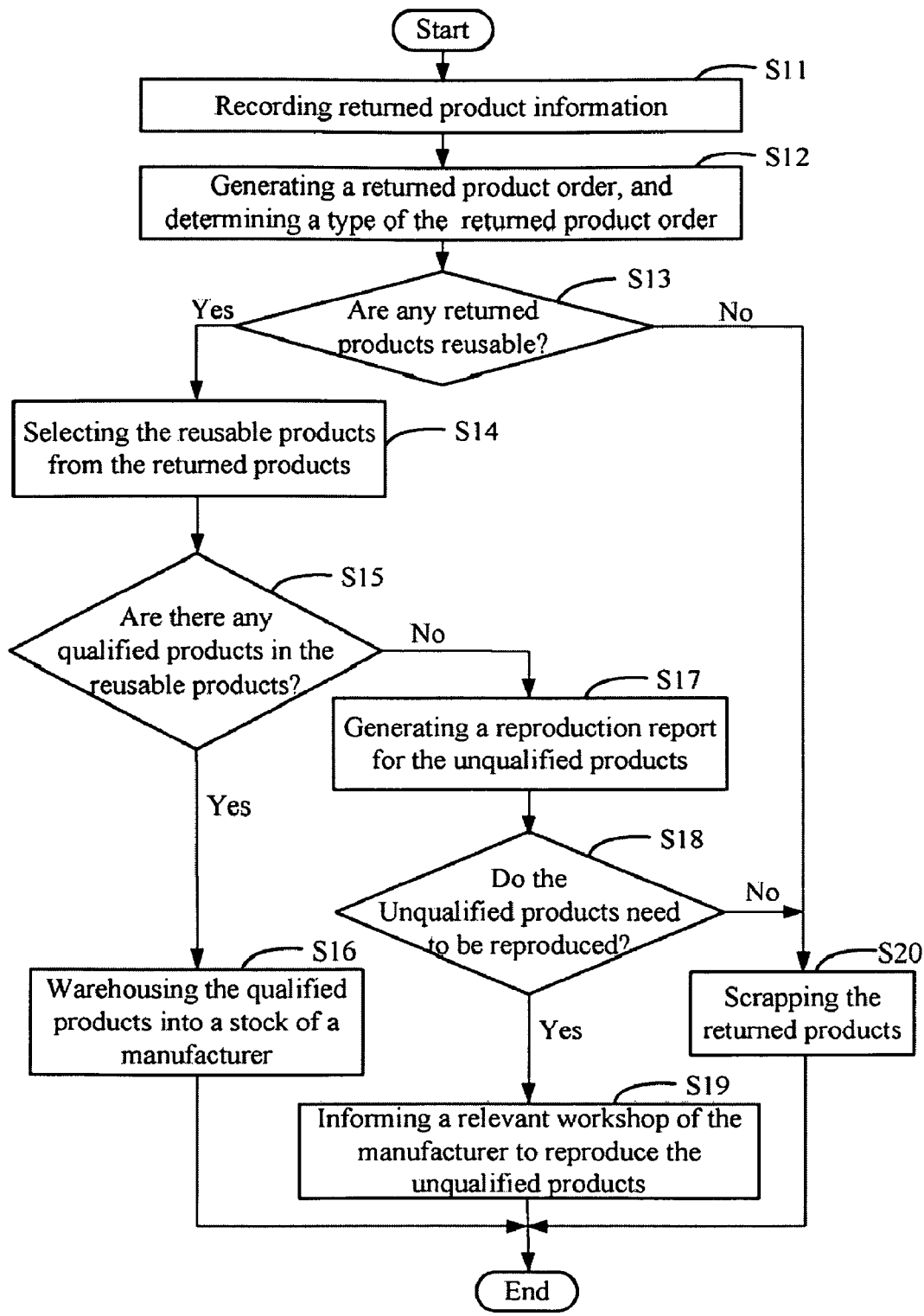
FIG. 2 is a flowchart of one embodiment of a method for managing product returns by implementing the system of FIG. 1.

FIG. 2 is a flowchart of one embodiment of a method for managing product returns by implementing the product returns management module 10 of FIG. 1 as described above. Depending on the embodiment, additional blocks may be added, others removed, and the ordering of the blocks may be changed.

In block S11, the information recording module 110 receives information of returned products from each of the client computers 2 via the network, and records the returned product information into the data storage system 12 of the application server 1.

In block S12, the returned order generating module 120 generates a returned product order based on the returned product information, and determines the type of the returned product order according to the returned cause of the returned products. The returned product order may include, but is not limited to, the customer name, the product name, the product number, the product quality and the returned cause of the returned products.

In block S13, the determining module 130 determines if any returned products are reusable by analyzing the returned cause of the returned products. If all the returned products are non-reusable, in block S20, the product scrapping module 160 determines to scrap the non-reusable products. Otherwise, if there are reusable products in the returned products, in block S14, the product processing module 140 selects the reusable products from the returned products.

In block S15, the determining module 130 determines if there are any qualified products in the reusable products. If there are qualified products in the reusable products, in block S16, the product warehousing module 150 warehouses the qualified products into the stock of the manufacturer. Otherwise, if the reusable products are unqualified products, in block S17, the reproduction module 170 generates a reproduction report for the unqualified products according to the returned product order, and stores the reproduction report into the data storage system 12 of the application server 1.

In block S18, the determining module 130 determines if the unqualified products need to be reproduced according to the type of the returned order. If the unqualified products need not to be reproduced by the manufacturer, in block S20, the product scrapping module 160 determines to scrap the unqualified products. Otherwise, if the unqualified products need to be reproduced by the manufacturer, in block S19, the reproduction module 170 informs a relevant workshop of the manufacturer to reproduction of the unqualified products according to the reproduction report.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing system for managing product returns, the system comprising:
 an information recording module configured for receiving information of a set of returned products, and recording the returned product information into a data storage system;
 a returned order generating module configured for generating a returned product order based on the information of the returned products, the returned product order comprising a returned cause of the returned products;
 a determining module configured for determining if any returned products are reusable by analyzing the returned cause of the returned products, and determining if there are qualified products in the reusable products;
 a product processing module configured for selecting the reusable products from the returned products if there are reusable products in the returned products;
 a product warehousing module configured for warehousing the reusable products into a stock of a manufacturer;
 a product scrapping module configured for determining to scrap the non-reusable products;
 a reproduction module configured for generating a reproduction report for unqualified products according to the returned product order, informing a relevant workshop of the manufacturer to reproduce the unqualified products according to the reproduction report, and storing the reproduction report into the data storage system; and
 at least one processor executing the information recording module, the returned order generating module, the determining module, the product processing module, the product warehousing module, the product scrapping module, and the reproduction module.

2. The system according to claim 1, wherein the returned order generating module is further configured for determining a type of the returned product order according to the returned cause of the returned products.

3. The system according to claim 2, wherein the determining module is further configured for determining if the unqualified products need to be reproduced according to the type of the returned order.

4. The system according to claim 3, wherein the product scrapping module is further configured for determining to scrap the unqualified products that do not need to be reproduced by the manufacturer.

5. The system according to claim 3, wherein the reproduction module is further configured for informing the relevant workshop of the manufacturer to reproduce the unqualified products if the unqualified products need to be reproduced by the manufacturer.

6. A computer-implemented method for managing product returns, the method comprising:
 receiving information of a set of returned products, and recording the returned product information into a data storage system of a computer;
 generating a returned product order based on the returned product information, the returned product order comprising a returned cause of the returned products;
 determining if any returned products are reusable by analyzing the returned cause of the returned products;
 determining, by the computer, to scrap the non-reusable products if the returned products are non-reusable;
 selecting the reusable products from the returned products if there are reusable products in the returned products;

determining if there are any qualified products in the reusable products;

warehousing the qualified products into a stock of a manufacturer if there are qualified products in the reusable products;

generating a reproduction report for the unqualified products according to the returned product order;

informing a relevant workshop of the manufacturer to reproduce the unqualified products according to the reproduction report; and storing the reproduction report into the storage of the computer.

7. The method according to claim 6, further comprising:

determining a type of the returned product order according to the returned cause of the returned products.

8. The method according to claim 7, further comprising:

determining if the unqualified products need to be reproduced according to the type of the returned order;

determining to scrap the unqualified products, if the unqualified products do not need to be reproduced by the manufacturer; and informing the relevant workshop of the manufacturer to reproduce the unqualified products, if the unqualified products need to be reproduced by the manufacturer.

9. A computer-readable medium having stored thereon instructions that, when executed by a computer, causing the computer to perform a method for managing product returns, the method comprising:

receiving information of a set of returned products, and recording the returned product information into a data storage system of the computer;

generating a returned product order based on the returned product information, the returned product order comprising a returned cause of the returned products;

determining if any returned products are reusable by analyzing the returned cause of the returned products;

determining to scrap the non-reusable products if the returned products are non-reusable;

selecting the reusable products from the returned products if there are reusable products in the returned products;

determining if there are any qualified products in the reusable products;

warehousing the qualified products into a stock of a manufacturer if there are qualified products in the reusable products;

generating a reproduction report for the unqualified products according to the returned product order, informing a relevant workshop of the manufacturer to reproduce the unqualified products according to the reproduction report; and storing the reproduction report into the storage of the application server.

10. The medium according to claim 9, wherein the method further comprises:

determining a type of the returned product order according to the returned cause of the returned products.

11. The medium according to claim 10, wherein the method further comprises:

determining if the unqualified products need to be reproduced according to the type of the returned order;

determining to scrap the unqualified products, if the unqualified products do not need to be reproduced by the manufacturer; and informing the relevant workshop of the manufacturer to reproduction of the unqualified products, if the unqualified products need to be reproduced by the manufacturer.

\* \* \* \* \*